United States Patent [19]
Mirtain

[11] 3,782,438
[45] Jan. 1, 1974

[54] PNEUMATIC TIRE AND TREAD THEREFOR HAVING VARIABLE ROLLING CONTACT WITH THE GROUND

[75] Inventor: Henri Jean Mirtain, Compiegne, France

[73] Assignee: Uniroyal, Clairoix Oise, France

[22] Filed: Mar. 6, 1972

[21] Appl. No.: 232,130

[30] Foreign Application Priority Data
Mar. 12, 1971 France.............................7108761

[52] U.S. Cl............................................. 152/209 R
[51] Int. Cl............................................. B60c 11/04
[58] Field of Search...................................... 152/209

[56] References Cited
UNITED STATES PATENTS
3,176,748 4/1965 Giebhart............................. 152/209
3,482,616 12/1966 French................................ 152/209

*Primary Examiner*—James B. Marbert
*Attorney*—Jay L. Chaskin

[57] ABSTRACT

A high speed pneumatic tire with a tread whose width of running contact with the ground is automatically variable. The tread consists of a central portion that is in constant contact over its entire width with the ground and two lateral shoulder portions which are respectively arranged on each side of the central portion and are each separated from the central portion by an essentially continuous circumferential groove that forms a flexible joint or coupling. Each lateral shoulder portion of the tread is radially contracted and inclined with respect to the central portion so that it contacts the ground where required by the dynamic forces on the tire, e.g., acceleration, turning and braking. The central and lateral shoulder portions of the tread each may have the same or different design patterns for particular purpose, e.g., snow, anti-skid. The tire may have a radial carcass and may also include a reinforcing breaker formed of continuous or discontinuous layers.

40 Claims, 15 Drawing Figures

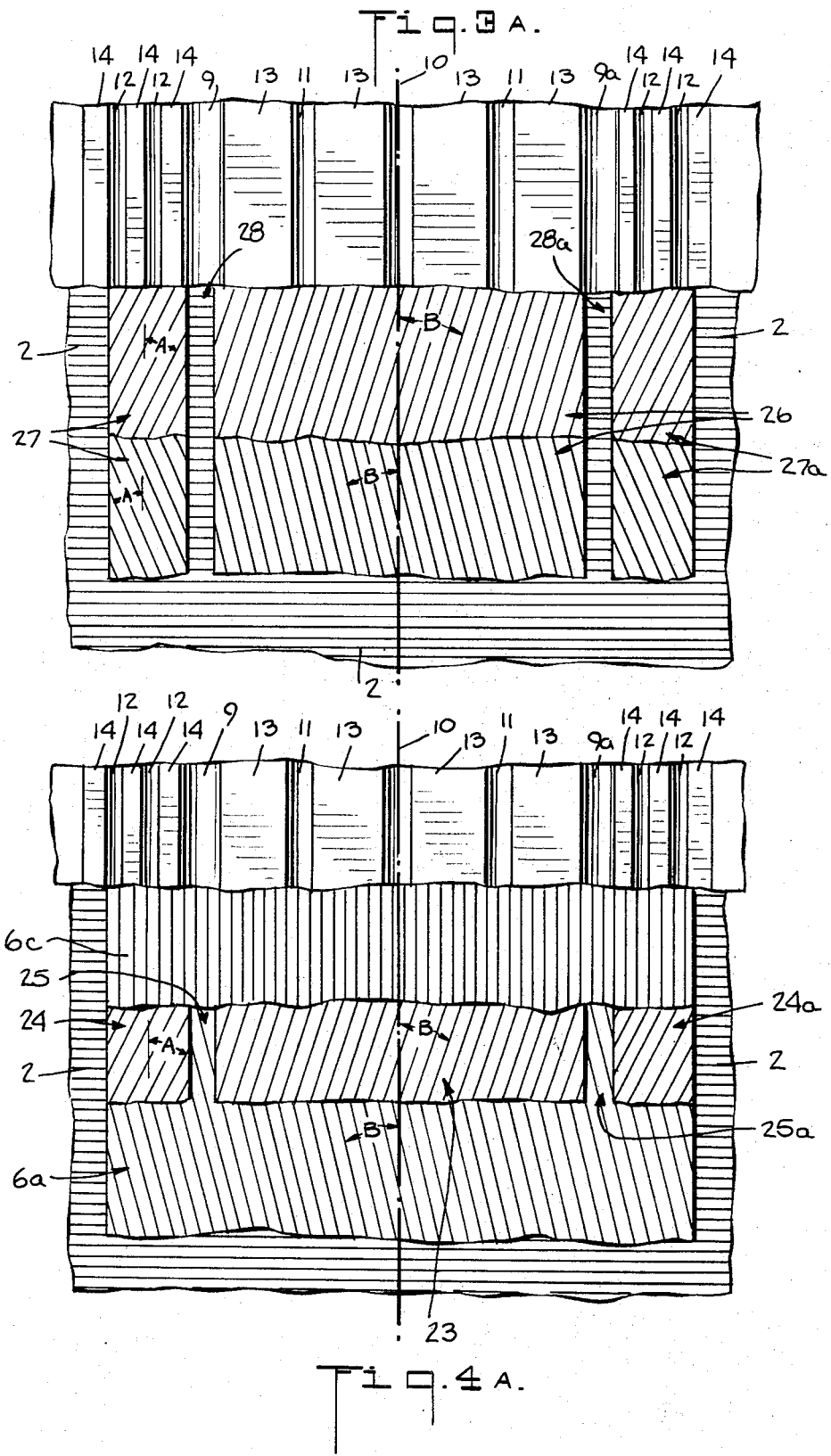

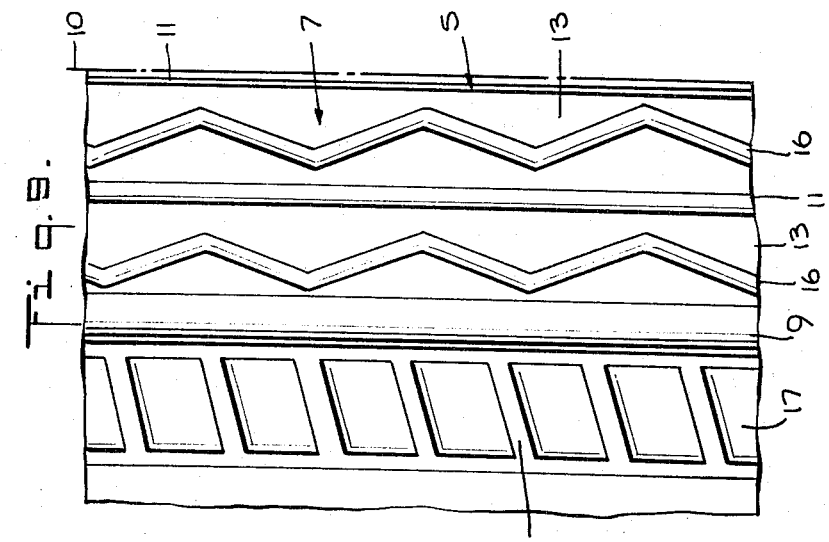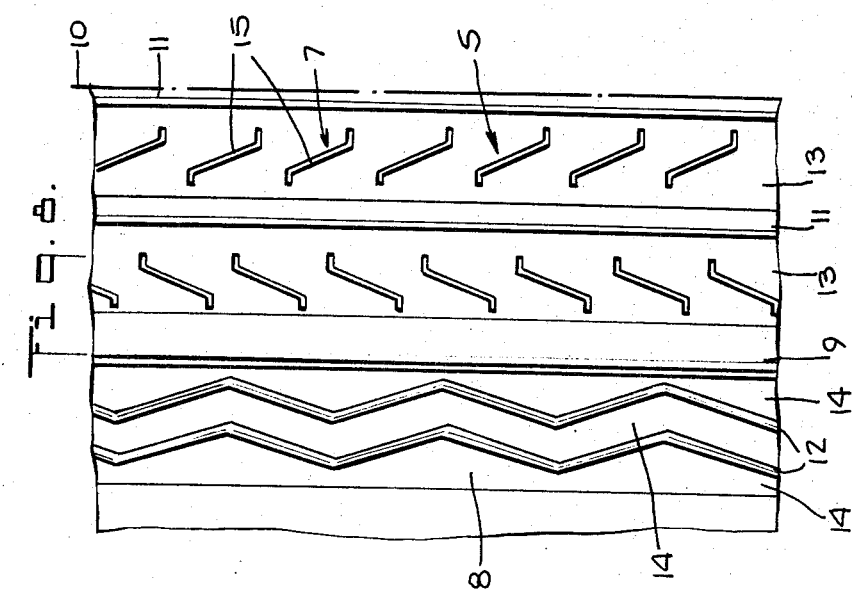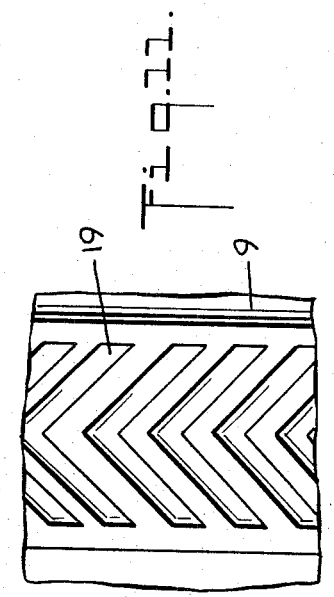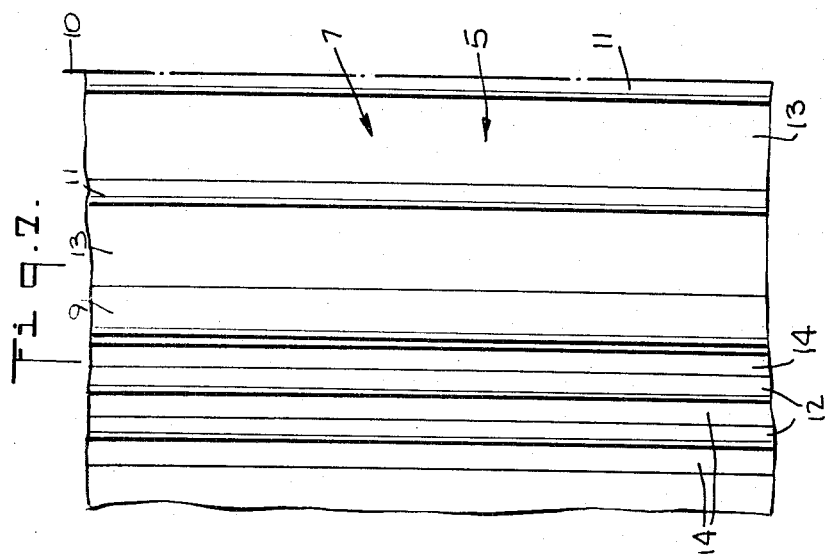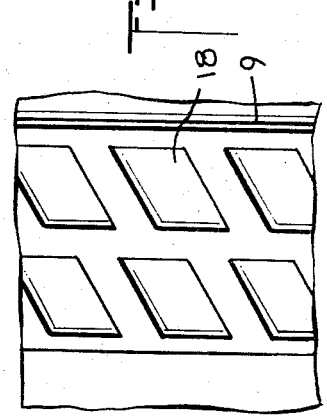

PNEUMATIC TIRE AND TREAD THEREFOR HAVING VARIABLE ROLLING CONTACT WITH THE GROUND

This invention generally concerns a pneumatic tire tread and more particularly, the contact of the tread with the ground under operating conditions.

It is known that when the tread of a pneumatic tire runs in a straight line, resistance to rolling is an increasing function of the speed of travel, whereby this resistance increases very rapidly according to an essentially exponential form with speed, particularly at high speeds, i.e., for example, speeds above 180 km per hour. The result is that at high speeds, it is important that the effective width of contact of the tread with the ground be as narrow as possible since a small contact width promotes reduction of resistance to rolling. Frictional heating of the pneumatic tire and the tread, in particular, is reduced and consequently there is less wear on the tread. Further the phenomenon known as "aquaplaning" or "hydroplaning" occurs on a surface covered with a layer of liquid, and specifically water, in which, the water cannot be evacuated fast enough from under the wheels of a vehicle travelling at a high speed by the grooves or designs in the tread of each pneumatic tire. As a consequence the tires of the vehicle are lifted or separated from the ground and are supported only by the layer of liquid, which results in the practically complete loss of adherence of the wheel to the ground, and consequently a loss of steering or directional control of the vehicle with the risk of skidding, swerving, and serious accidents. The vehicle speed at which such a dangerous phenomenon may occur is a function of various parameters or factors such as the inflation pressure of the pneumatic tire, the vehicle load on the tire, the depth of the tread design of each pneumatic tire, the effective width of running contact with the ground, etc. This critical speed at which the above-mentioned dangerous phenomenon appears is particularly a decreasing function of the effective width of running contact of each pneumatic tire with the ground. When the critical speed is higher, the smaller the effective width of running contact with the ground or the narrower the tread. A small effective width of running contact is therefore preferable for decreasing the risk of the appearance of the "aquaplaning" phenomenon.

It can be stated, however, if the effective width of running contact is small or if the tread is narrow, the pressure in the area of contact with the ground is generally higher. In addition, a narrow tread generally is not favorable from the viewpoint of safety of a pneumatic tire or vehicle behavior during turning. During a turning motion at a relatively high speed, for example, when the vehicle is negotiating a curve, the centrifugal force and possibly other passive forces of inertia or the lateral or transverse reaction acting on each pneumatic tire, tend to make the tire tilt to the side, so that a portion (radially internal with respect to turning) of the tread of each pneumatic tire, which is initially in contact with the ground, rises and separates from the ground. The tread no longer adheres to the ground except by a relatively small portion (radially exterior with respect to turning), and hence the serious risk of skidding. This risk of skidding is greater with pneumatic tire treads which have projecting shoulders than with pneumatic tire treads which have rounded shoulders. Consequently, a narrow tread, i.e., a small effective width of running contact, is generally undesirable to the safety of travel during turning.

It is therefore seen that the requirements or conditions for maintaining an optimum route or optimum behavior of an automobile vehicle are contradictory and relatively incompatible for straight-line travel and turning, since in straight-line travel it is important that the effective width of running contact with the ground or the tread of each pneumatic tire tread be as narrow as possible, while it must, in contrast, be as wide as possible for turning motion.

It is the principal object of the present invention to provide an improved high-speed tire.

It is an object of the present invention to provide a pneumatic tire tread for automobile vehicles designed to travel at a high speed (at least equal to or greater than 180 km per hour) whose effective width of running contact with the ground would be automatically variable. It is a further object of the present invention to provide a pneumatic tire which is relatively narrow during straight-line travel (to decrease resistance to rolling) and relatively wide during turning motion (to increase safety against skidding).

According to the invention a pneumatic tire has a tread whose width of running contact with the ground is automatically variable and which comprise a central portion designed to be in contact over its entire width with the ground and two lateral shoulder portions designed to be in temporary contact with the ground. The two lateral portions are respectively arranged on each side of the central portion and each separated from the other by an essentially continuous circumferential groove. Each lateral shoulder portion is radially contracted with respect to the central portion in order to project less toward the outside than the central portion. This tread construction provides that, during straight-line travel, the tread contacts the ground only by its central portion, i.e., by a relatively narrow zone, whereas during a high-speed turning motion, the lateral shoulder portion, which is on the radially external side with respect to turning, makes temporary contact with the ground by a corresponding deformation of the tire tread. Thus the effective surface of running contact with the ground is wider because of the simultaneous contact of the central portion and one lateral shoulder portion of the tread with the ground.

In one embodiment of the invention, where the tread is provided with circumferential grooves that are continuously spaced and at least approximately parallel, each of the lateral shoulder portions of the tread has circumferential grooves and the groove that separates each lateral shoulder portion of the above-mentioned central portion is transversely wider than and at least as deep as the other grooves. The presence of this wide groove at the junction of each lateral shoulder portion with the central portion of the tread provides a flexible joint coupling that promotes separation of each lateral shoulder portion relative to the central portion.

According to a further embodiment of the invention, the tire has a radial carcass with a breaker that forms a reinforcing belt, the belt extending transversely under the lateral shoulder portions at least over the major part of their width.

According to still a further embodiment of the invention, where the reinforcing breaker comprises at least two superimposed parallel metallic-cord separating layers or plies, there layers are essentially of the same total width in the radial cross section of the tire tread.

According to still another embodiment of the invention, at least one layer of the reinforcing breaker is transversely discontinuous and consists of three successive transverse sections. The transverse sections are respectively bounded by two spacing intervals respectively situated beneath and adjacent to the grooves that separate the lateral shoulder portions of the tread from its central portion. The transverse breaker sections may be part of the same common layer with spacing intervals formed by the absence of metallic cords. Alternatively the transverse breaker sections may be part of three distinct juxtaposed circumferential layer elements that are separated by the spacing intervals.

Thus, the improved tire tread structure of this invention has a breaker which extends just under the lateral shoulder portions of the tread, whereby the flexible coupling of these lateral shoulder portions with the central portion of the tread is promoted by deep or wide grooves and by discontinuities in the breaker layers beneath and adjacent the junction of each lateral shoulder portion with the central portion.

Under normal operating conditions, the tire tread according to this invention, i.e., at a generally constant speed with approximately uniform rectilinear travel of the vehicle without acceleration or braking, the tread contacts the ground only with the central portion. Under variable operating conditions, particularly under the effect of braking or acceleration during, for example, straight-line motion, at least one portion of the lateral shoulder portions makes contact with the ground because of the dynamic forces acting on the tire tread. Thus the total area of contact with the ground is increased, and therefore the adherence of the wheel to the ground.

The improved tread according to the invention, having a central portion and two lateral shoulder portions, is preferably essentially symmetrical relative to the equatorial or median plane perpendicular to the geometric axis of rotation or revolution of the tire. However, the tread also may be non-symmetrical, i.e., asymmetrical, where for example, the tire is intended for use in racing cars or competition sports cars and is to be driven at closed-loop race tracks in one permanent circular direction which is always relatively the same as the direction of rotation of the car around the closed loop.

The tire tread according to the invention is also very advantageous for driving in snow and over soft terrain. In hard snow, a narrow tread is preferable and, the tire tread bears on the ground only with its central portion. In soft snow or over soft terrain, in contrast, a wide tread is preferable, so that the tire tread simultaneously bears with its central portion and at least a part of its lateral shoulder portions. In soft snow or over soft terrain, the central portion of the tread of the pneumatic tire particularly serves to support the tire while the tractional force of the wheel is transmitted to the ground essentially by the sides or lateral shoulder portions.

The invention will be better understood and other purposes, characteristics, details, and advantages will appear more clearly upon reading the explanatory description that follows in reference to the attached schematic drawings, which are given only as nonlimiting examples to illustrate the various embodiments of the invention and in which:

FIG. 3A shows in partial section another view of FIG. 3;

FIG. 4A shows in partial section another view of FIG. 4;

FIG. 7 is a partial top view expanded in the plane of a lateral shoulder portion and a part of the central portion of the tread according to the invention which contains designs in an essentially rectilinear lined configuration;

FIG. 8 is a partial top view, expanded in the plane of the tread which shows a zig-zag design in the lateral shoulder portion and a rectilinear design in the central portion with antiskid slots or ridges;

FIG. 9 is a partial top view expanded in the plane of the tread which shows a block-configuration design in the lateral shoulder portion and a zig-zag and rectilinear design in the central portion of the tread;

FIG. 10 represents a partial top view of a lateral shoulder portion of the tread with pavement-shaped designs; and FIG. 11 is a partial top view of a lateral shoulder portion of the tread, which shows designs having a transverse chevron configuration.

Figure 1A:
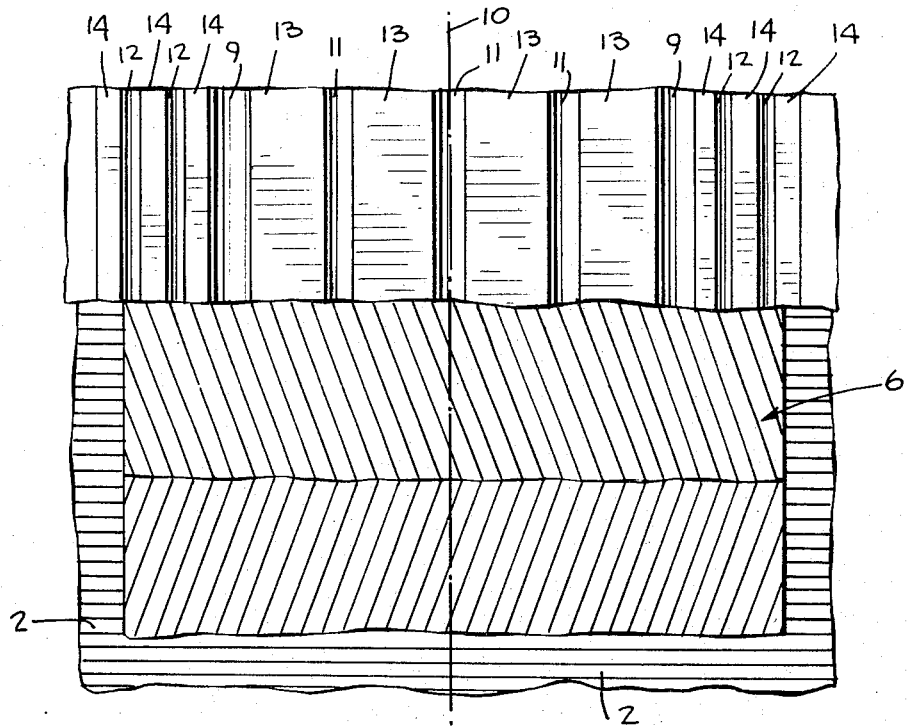
FIG. 1A shows in partial section another view of FIG. 1.
Figure 1:
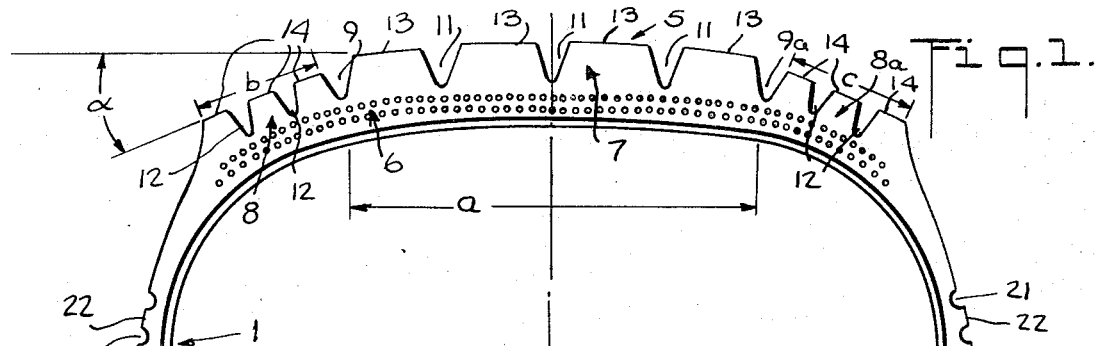
FIG. 1 represents a radial cross-sectional profile view of a pneumatic tire according to one embodiment of the invention which contains two transversely continuous reinforcing breaker layers.

According to the embodiment example represented in FIG. 1, the tire has a radial carcass 1 that includes one or more layers 2 of corded fabric cemented to wires or threads oriented in radial planes perpendicular to the equatorial plane 10 of the tire and extending between bead 3, the carcass ply 2 is turned back or folded back at its respective ends, for example, to the outside around each bead wire 4. The tire has a tread 5, and located between the tread and the carcass ply is a reinforcement 6 that forms an essentially rigid or inextensible reinforcing breaker. The breaker may comprise, for example as shown in FIG. 1A, at least two superimposed metallic, for example, steel, or non-metallic, for example, textile, layers whose cords are at equal but opposite angles to the equatorial plane 10, the angle being in the range of 16° to 30°. The reinforcing breaker 6 extends transversely practically over the entire width of the tread 5.

The tread 5 is subdivided transversely into three parts that comprise a central portion 7 and two lateral shoulder portions 8, 8a. Each of the lateral shoulder portions is separated from the central portion 7 by a circumferential peripheral groove 9, 9a that is relatively wide and deep, which respectively constitutes a flexible joint or coupling means for each lateral shoulder portion with the central portion. Each lateral shoulder portion 8, 8a of width b, c, is advantageously contracted with respect to the central portion 7 of width a, i.e., it projects less radially to the outside than the latter. The tread 5 may be symmetrical relative to the equatorial plane 10 of the tire, in which both lateral shoulder portions 8, 8a are essentially identical and have the same width $b = c$. The tread 5 may be non-symmetrical, in which both lateral shoulder portions 8, 8d are thus unlike and may have different and unequal widths as well as different designs.

The two superimposed layers of the reinforcing breaker 6 have essentially the same total width. In FIGS. 1 and 1A, the breaker has an essentially continuous cross section. Each of the three parts of the tread 5 has designs, for example, in the form of grooves 11, 12, which are spaced transversely, and extend in a generally circumferential direction about the tire tread, and projecting ribs 13, 14 between them. The grooves 9, 9a which separate one respective lateral shoulder portion from the central portion of the tread, are transversely wider than and at least as deep as the other grooves 11, 12. Grooves 9, 9a, 11 and 12 provide a means for water evacuation from under the tire tread.

The exterior middle section of sidewalls 20 of the pneumatic tire are provided with circular channels 21 that border circular projecting ribs 22. The channels 21 and ribs 22 provide each sidewall 20 with flexibility or elasticity, which reduces the risk of slipping or skidding during turning. The sidewall flexes first before lifting the adjacent lateral shoulder portion under the effect of transverse or centrifugal dynamic forces.

The entire width of the variable road contacting tread surface of each lateral shoulder portion 8 or 8a of the tread 5 is inclined relative to a plane tangent to the middle of the central portion, at an angle $\alpha$ whose value may be between 10° and 30°, and is preferably equal to 25°.

In a typical construction, the transverse width of the central portion 7 of the tread 5 represents, for example, approximately 51 percent of the total maximum width of the tire tread in the unloaded, inflated state, whereas the width of each lateral shoulder portion 8, 8a represents approximately 20 percent of this total maximum width and the width of each groove 9, 9a represents approximately 4.5 percent of the total width.

Figure 2A:
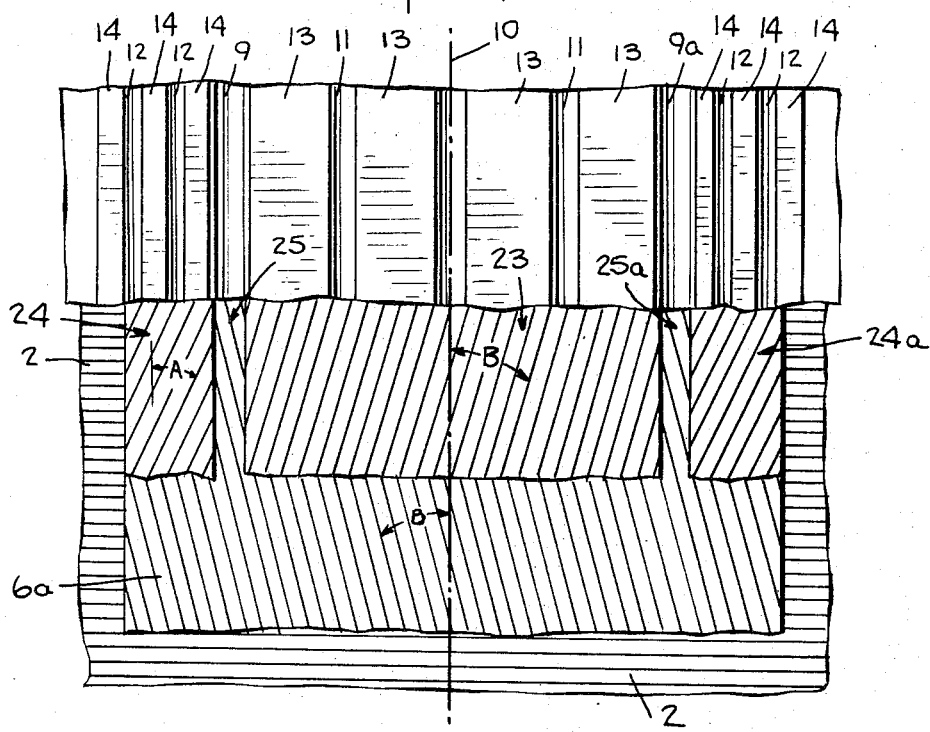
FIG. 2A is another view of FIG. 2, in partial section.
Figure 2:
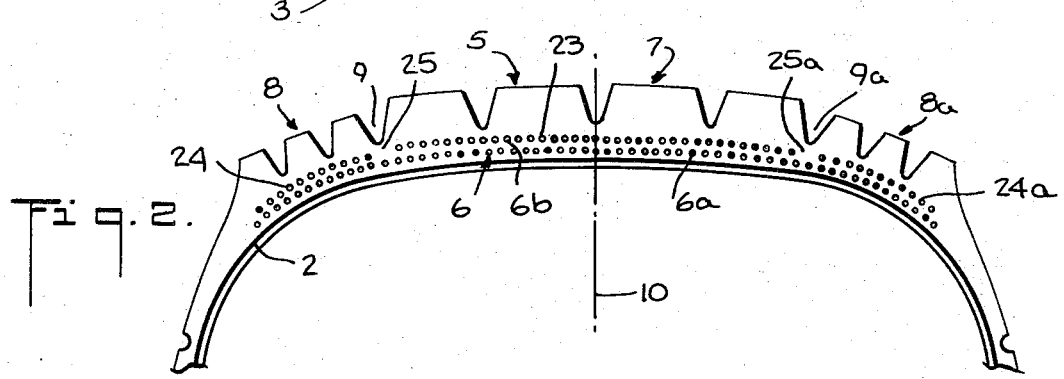
FIG. 2 is a partial cross-sectional view of the tire, which shows another embodiment with two superimposed transversely continuous and discontinuous, respectively, reinforcing breaker layers.

FIGS. 2 and 2A discloses another embodiment of the tire according to the invention, which differs from that of FIG. 1 by the configuration of the reinforcing breaker 6. In this embodiment, the radially innermost layer 6a has a continuous cross section, whereas the radially outermost layer 6b is transversely discontinuous. The layer 6b comprises three successive transverse sections which respectively consist of a central section 23 and two lateral shoulder sections 24, 24a that are placed on each side of the central section 23. The three sections 23, 24, 24a are respectively bounded by two spacing intervals 25, 25a that are located directly beneath and opposite to the grooves 9, 9a that separate the lateral shoulder portions 8, 8a of the tread 5 from its central portion 7. The three sections may either be part of the same common layer 6b in which the spacing intervals 25, 25a comprise the absence of metallic cords or else respectively consist of three laterally juxtaposed and distinct circumferential layer elements separated by the spacing intervals 25, 25a. The superimposed layers 6a, 6b may have biased parallel metallic cords, as shown in FIG. 2A, which cords are inclined at equal but opposite angles relative to the equatorial plane 10 and which are crossed from one layer to the other. The cords of the radially innermost layer 6a and those of the lateral shoulder sections 24, 24a, of the radially outermost layer 6b may have a bias angle A in the range 20°–30°, whereas the cords of the central section 23 of the radially outermost layer 6b may have a bias angle B in the range 12°–18°. It should be noted in this regard that a relatively small bias angle is favorable for reducing resistance to rolling, but has an unfavorable effect on driving comfort. In particular, it is important that the shoulders of the tire have a larger biased angle for the cords.

Figure 3:
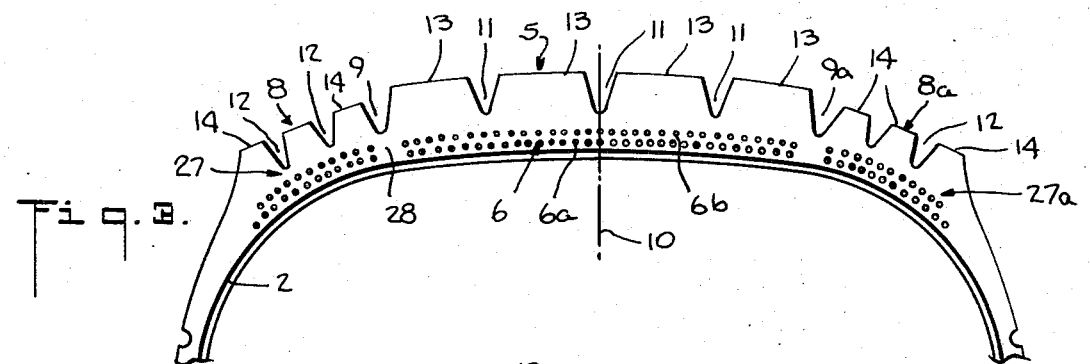
FIG. 3 is a partial cross-sectional view of the tire which represents an embodiment in which the two top layers that form the reinforcing breaker are transversely discontinuous.

In the embodiment shown in FIG. 3, the reinforcing breaker is formed in a known manner, by at least two superimposed layers 6a, 6b that are transversely discontinuous and consist of parallel steel cords. As shown particularly in FIG. 3A each layer 6a, 6b comprises three successive mutually adjacent transverse sections, a central section 26 and two lateral sections 27, 27a. The sections 26, 27, 27a, respectively, are bounded by two spacing intervals 28, 28a that are located, as in FIG. 2, beneath and opposite to the grooves 9, 9a, respectively. In each layer, the three sections may either be part of the same common layer 6a or 6b in which the spacing intervals 28, 28a, comprise the absence of metallic cords, or else may respectively consist of three laterally coupled and distinct circumferential layer elements separated by these spacing intervals. As shown in FIG. 3A, the layers 6a, 6b are at equal but opposite bias angles A and B. The lateral section 27, 27a have cords at angle A whereas the central section 26 has cords at angle B.

Figure 4:
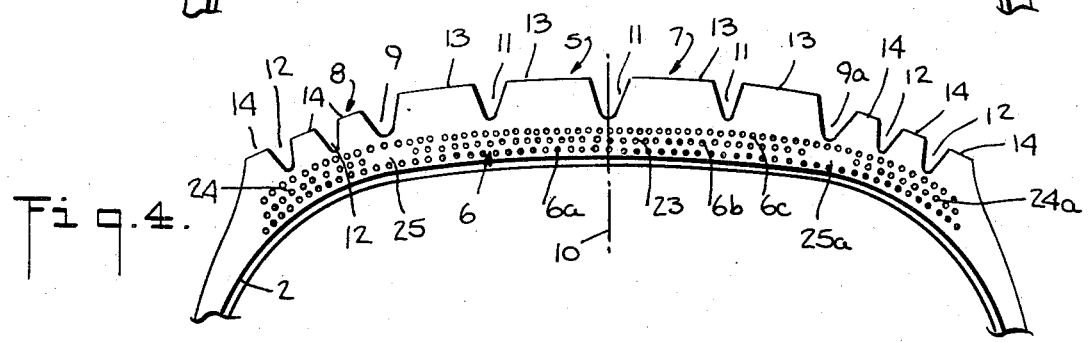
FIG. 4 is a partial cross-sectional view similar to FIG. 2, showing a modification in which the reinforcing breaker is radially surrounded by at least one layer of circumferential, parallel textile threads or cords.

In the embodiment shown in FIG. 4, the reinforcing breaker 6 is composed, for example, as in FIGS. 1, 2 and 3 and includes at least one layer 6c comprising circumferentially arranged fabric threads or cords. The cords, threads or filaments of layer 6c are parallel to the equatorial plane 10, i.e. at angle of zero degrees, and surround the breaker layers 6a, 6b. Layer 6c preferably extends continuously over at least the entire width of the breaker, and therefore also under the lateral shoulder portions 8, 8a of the tread 5. Layer 6c is preferably made by wrapping a single strip or layer around the reinforcing breaker layers 6a, 6b, the ends of the strip or layer overlapping. In addition to the advantages recited previously as a result of the presence of fabric-corded layer 6c, this layer offers the additional advantage of preventing possible tears or ruptures at the bottom of each groove 9, 9a. Layer 6c may also be used in FIGS. 1 to 3.

The width of layer 6b of FIGS. 2 or 4 or of the shoulder sections 27, 27a of FIG. 3 are shown as being approximately equal to the width of lateral shoulder sections 8, 8a. The width of layer 6b of FIGS. 2 or 4 or the shoulder sections 27, 27a of FIG. 3 may have a width different than the width of lateral shoulder sections 8, 8a.

Figure 6:
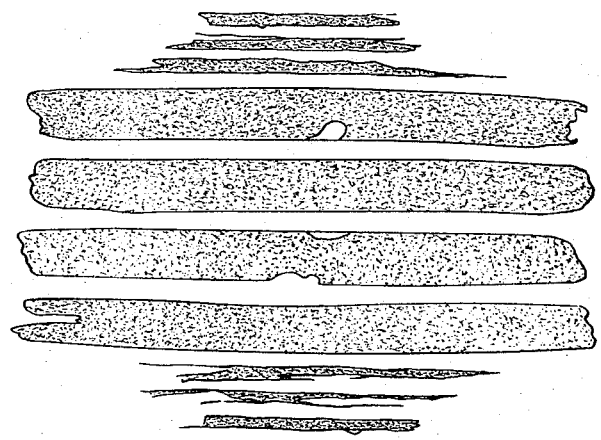
FIG. 6 shows the outline or impression on the ground by a tire tread according to the invention, which contacts simultaneously with the central portion and at least one part of the lateral shoulder portions of the thread.
Figure 5:
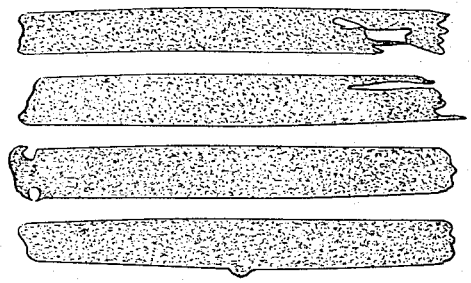
FIG. 5 represents the outline or impression on the ground by the tire tread according to the invention which contacts only with the central portion of its tread.

The tread according to the invention with a design such as that of FIG. 7 (to be described) causes the track or imprint on the ground shown in FIG. 5. In FIG. 5 only the central portion 7 of the tread 5is in 5 is with the ground. FIG. 6 shows the track or impression when the central portion 7 and a major part of the lateral shoulder portions 8, 8a of the tread are simultaneously in contact with the ground. A comparison of FIGS. 5 and 6 shows that the effective bearing capacity of the tread is considerably increased with respect to the track represented in FIG. 5.

FIGS. 7, 8, and 9 represent several different possible configurations of the designs in the tread 5. In FIG. 7, the central portion 7 and the lateral shoulder portion 8 of the tread 5 have a rectilinear lined configuration, i.e., longitudinal or circumferential grooves 11, 12. The grooves 11, 12 are situated in planes parallel to the equatorial plane 10 of the tire and adjacent respective projecting ribs 13, 14. This design which is well suited for driving over hard ground, is less favorable for traction in soft terrains.

In FIG. 8, the central portion 7 of the tread 5 is provided with antiskid slots, grooves, projections, ribs or ridges 15 in the ribs 13, whereas the lateral shoulder portion 8 has a zig-zag pattern formed by broken or crooked grooves 12 between the ribs 14. In FIG. 9, the central portion 7 of the tread has a combination of zig-zag grooves 16 disposed in the ribs 13 and rectilinear grooves 11, whereas the lateral shoulder portion 8 has a blocked design 17. Other design configurations are also possible, separately or in combination with the preceding configurations. For example in the lateral shoulder portion, pavement configurations 18 as in FIG. 10 or transverse chevron or lateral block 19 configurations as in FIG. 11. It should be noted that the tread designs shown in FIGS. 7, 8 and 9 are shown as being on the left of the equatorial plane 10. The design is repeated on the right side of the equatorial plane 10, where it may be the same as or different than the design on the left side of the equatorial plane. Furthermore, the tread configuration shown in FIGS. 1, 1A, 2, 2A, 3, 3A, 4, 4A may be any of the tread designs shown in FIGS. 7 to 11 or any combination thereof.

As used herein, the term "cords" means cords, threads, filaments, wires, cables or the like. Such cords may be metallic, for example, steel, or non-metallic, for example, glass or textile. The textile may be natural or synthetic, for example, rayon, polyester or nylon.

It is understood that the invention is not limited solely to the embodiment described and represented, which were given only as examples. In particular, it includes all means that constitute technical equivalents of the means described, as well as their combinations, if the latter are carried out in the spirit of the invention. The scope of the invention is to be determined, therefore, by the attached claims.

I claim:

1. A pneumatic tire having a tread comprising
   a road contact central portion having a plurality of spaced circumferential extending continuous grooves;
   a first shoulder portion arranged laterally of the central portion, the tread surface forming said first portion having a width in variable contact with the road;
   the first shoulder portion being spaced from the central portion by a circumferentially extending first groove;
   the entire width of the first shoulder tread contacting surface being disposed at an angle to the central portion within the range of 10° to 30° so as to have a radially variable lesser extent than the central portion;
   the first spacing groove having a transverse width greater than the width of the central portion grooves and a depth equal to the central portion grooves.

2. A pneumatic tire according to claim 1 wherein the angle between the central portion and the first shoulder portion is approximately 25°.

3. A pneumatic tire according to claim 1 wherein the design patterns of the tread on the central portion and on the first shoulder portion are the same.

4. A pneumatic tire according to claim 1 wherein the design patterns of the tread on the central portion is different from the design patterns of the tread on the first shoulder portion.

5. A pneumatic tire according to claim 1 comprising:
   a second shoulder portion arranged laterally of the central and first shoulder portions, the tread surface comprising said second portion having a width in variable contact with the road;
   the first and second shoulder portions being disposed on each side of the central portion;
   the second shoulder portion being spaced from the central portion by a circumferentially extending continuous second groove;
   the entire width of the second shoulder tread contact surface being disposed at an angle to the central portion within the range of 10° to 30° so as to have a radially variable lesser extent than the central portion;
   the second spacing groove having a transverse width greater than the width of the central portion grooves and a depth equal to the central portion grooves.

6. A pneumatic tire according to claim 5 wherein the angle between the central portion and the first shoulder portion is equal to the angle between the central portion and the second shoulder portion.

7. A pneumatic tire according to claim 5 wherein the design patterns of the tread on the central portion and on the shoulder portions are the same.

8. A pneumatic tire according to claim 5 wherein the design pattern of the tread on the central portion is different from the design pattern of the tread on the shoulder portions.

9. A pneumatic tire according to claim 6 wherein the angle between the central portion and the first and second shoulder portions, respectively, is approximately 25°.

10. A pneumatic tire according to claim 5 wherein the respective width of the first and second shoulder portions are equal.

11. A pneumatic tire according to claim 5 wherein the width of the central portion is 51 percent of the total width of the tread when the tire is inflated and under no load; the width of the first and second shoulder portions is 40 percent of the total width, and the width of the first and second spacing grooves is 9 percent of the total width.

12. A pneumatic tire according to claim 1 having a radial ply carcass;
a reinforcing breaker located between the tread and the carcass,
the breaker extending transversely under the central portion and the first shoulder portion.

13. A pneumatic tire according to claim 5 having a radial ply carcass
a reinforcing breaker located between the tread and the carcass,
the breaker extending transversely under the central portion and the first and second shoulder portions.

14. A pneumatic tire according to claim 12 wherein the breaker comprises a plurality of ply layers of equal widths.

15. A pneumatic tire according to claim 13 wherein the breaker comprises a plurality of ply layers of equal widths.

16. A pneumatic tire according to claim 14 wherein the breaker plies are transversely continuous.

17. A pneumatic tire according to claim 15 wherein the breaker plies are transversely continuous.

18. A pneumatic tire according to claim 14 wherein at least one of the breaker plies is transversely discontinuous.

19. A pneumatic tire according to claim 15 wherein at least one of the breaker plies is transversely discontinuous.

20. A pneumatic tire according to claim 18 wherein the transverse discontinuous ply is the radially outermost layer.

21. A pneumatic tire according to claim 19 wherein the transversely discontinuous ply is the radially outermost layer.

22. A pneumatic tire according to claim 20 wherein the transversely discontinuous breaker layer comprises a plurality of sections arranged transversely of each other, the transverse section being separated by a spacing interval, the spacing interval being disposed opposite and under the first spacing groove.

23. A pneumatic tire according to claim 21 wherein the transversely discontinuous breaker layer comprises a plurality of sections arranged transversely of each other, the transverse sections being separated by a respective spacing interval, each spacing interval being disposed opposite and under a respective first and second spacing groove.

24. A pneumatic tire according to claim 18 wherein the breaker comprises two transversely discontinuous layers, the layers being a plurality of two-ply sections arranged transversely of each other, the transverse sections being separated by a spacing interval, the spacing interval being disposed opposite and under the first spacing groove.

25. A pneumatic tire according to claim 19 wherein the breaker comprises two transversely discontinuous layers, the layers being a plurality of two-ply sections arranged transversely of eachother, the transverse sections being separated by a respective spacing interval, each spacing interval being disposed opposite and under a respective first and second spacing groove.

26. A pneumatic tire according to claim 22 wherein the breaker layer is a single common layer formed by parallel and adjacent cords, the spacing interval being the absence of cords in the layer.

27. A pneumatic tire according to claim 23 wherein the breaker layer is a single common layer formed by parallel and adjacent cords, the spacing interval being the absence of cords in the layer.

28. A pneumatic tire according to claim 24 wherein each breaker layer is a single common layer formed by parallel and adjacent cords, each spacing interval being the absence of cords in a respective layer.

29. A pneumatic tire according to claim 25 wherein each breaker layer is a single common layer formed by parallel and adjacent cords, each spacing interval being the absence of cords in a respective layer.

30. A pneumatic tire according to claim 22 wherein the breaker layer sections comprise a plurality of separate and distinct layer elements.

31. A pneumatic tire according to claim 23 wherein the breaker layer sections comprise a plurality of separate and distinct layer elements.

32. A pneumatic tire according to claim 24 wherein each of the breaker layer sections comprises a plurality of separate and distinct layer elements.

33. A pneumatic tire according to claim 25 wherein each of the breaker layer sections comprises a plurality of separate and distinct layer elements.

34. A pneumatic tire according to claim 12 comprising at least one further layer disposed directly under the tread, the width of the layer being substantially equal to the width of the breaker,
the further layer being a single strip wrapped around the breaker layers, the ends of the strip overlapping,
the cords of the strip being at zero degrees to the equatorial plane of the tire.

35. A pneumatic tire according to claim 14 wherein the breaker ply layers have parallel steel cords.

36. A pneumatic tire according to claim 15 wherein the breaker ply layers have parallel steel cords.

37. A pneumatic tire according to claim 35 wherein the cords of different breaker layers are oriented at equal but opposite bias angles to the equatorial plane of the tire, the angle formed by the cords under the central portion being in the range of 12° to 18° and the angle formed by the cords under the first shoulder portion being in the range of 20° to 30°.

38. A pneumatic tire according to claim 36 wherein the cords of different breaker layers are oriented at equal but opposite bias angles to the equatorial plane of the tire, the angle formed by the cords under the central portion being in the range of 12° to 18°, and the angle formed by the cords under the first and second shoulder portions being in the range of 20° to 30°.

39. A pneumatic tire according to claim 14 wherein the cords of different breaker layers are oriented at equal but opposite bias angles to the equatorial plane, the angle formed by the cords under the central portion being less than the angle formed by the cords under the first shoulder portion.

40. A pneumatic tire according to claim 15 wherein the cords of different breaker layers are oriented as equal but opposite bias angles to the equatorial plane, the angle formed by the cords under the central portion being less than the angle formed by the cords under the first and second shoulder portions.

* * * * *